April 26, 1938.  J. F. GUTMANN  2,115,262
WINDOW CONSTRUCTION FOR VEHICLES
Filed July 1, 1933  3 Sheets-Sheet 1
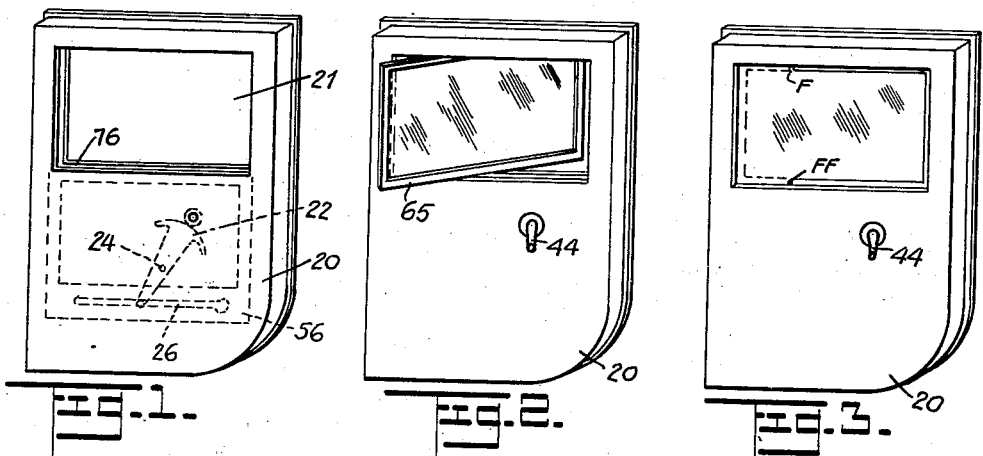
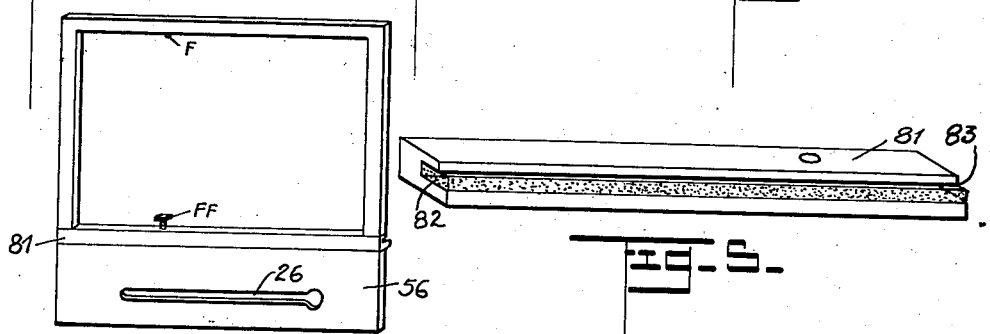
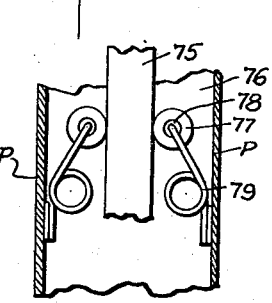
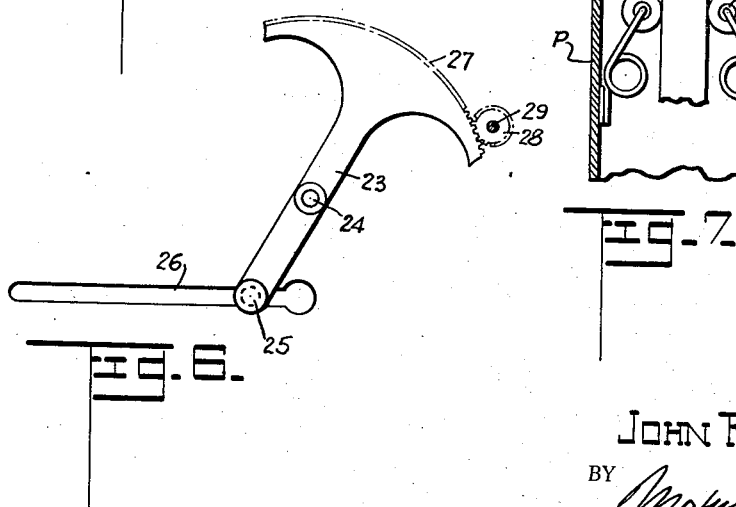
INVENTOR.
JOHN F. GUTMANN.
BY
ATTORNEY.

April 26, 1938.  J. F. GUTMANN  2,115,262
WINDOW CONSTRUCTION FOR VEHICLES
Filed July 1, 1933  3 Sheets-Sheet 2
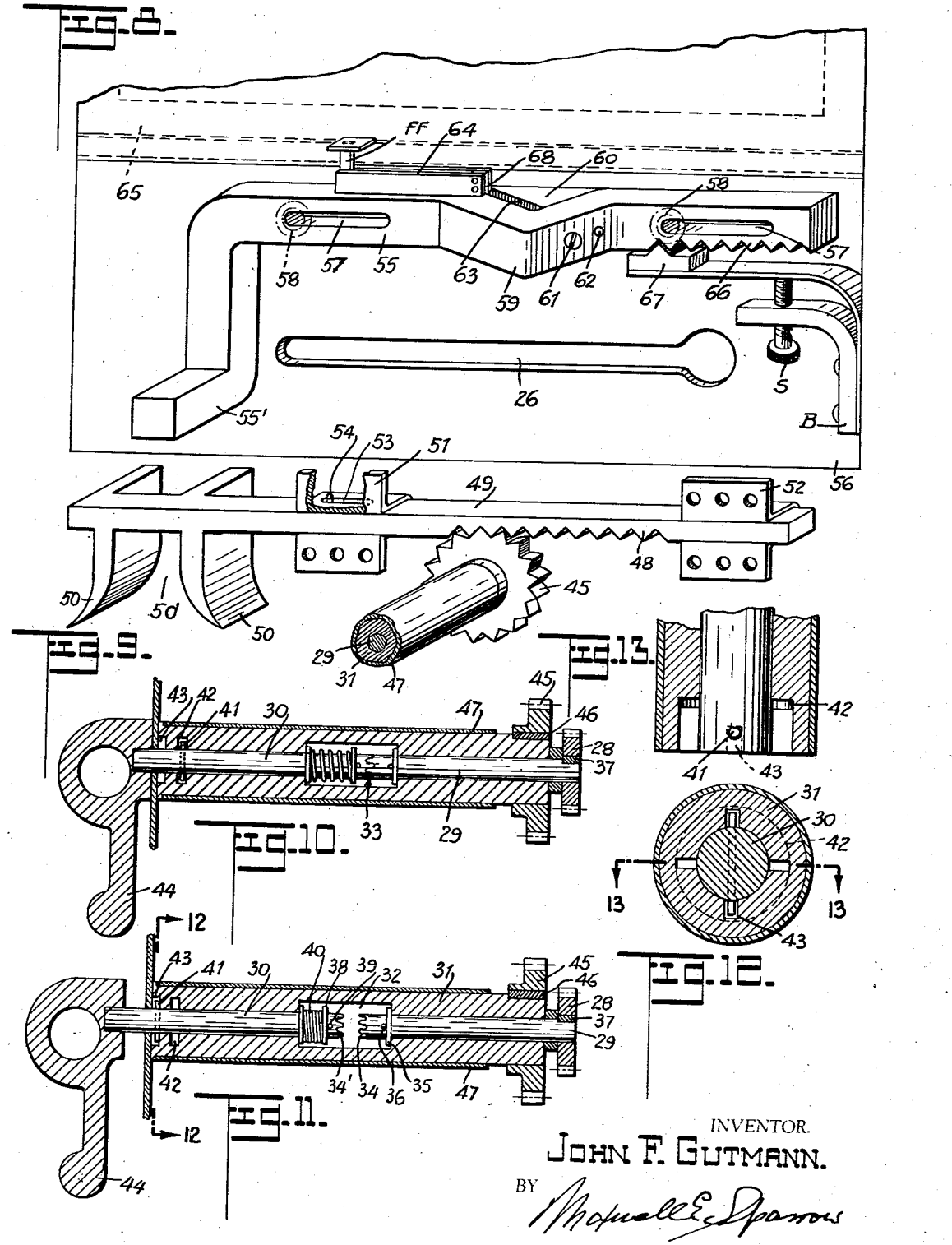
INVENTOR.
JOHN F. GUTMANN.
BY
ATTORNEY.

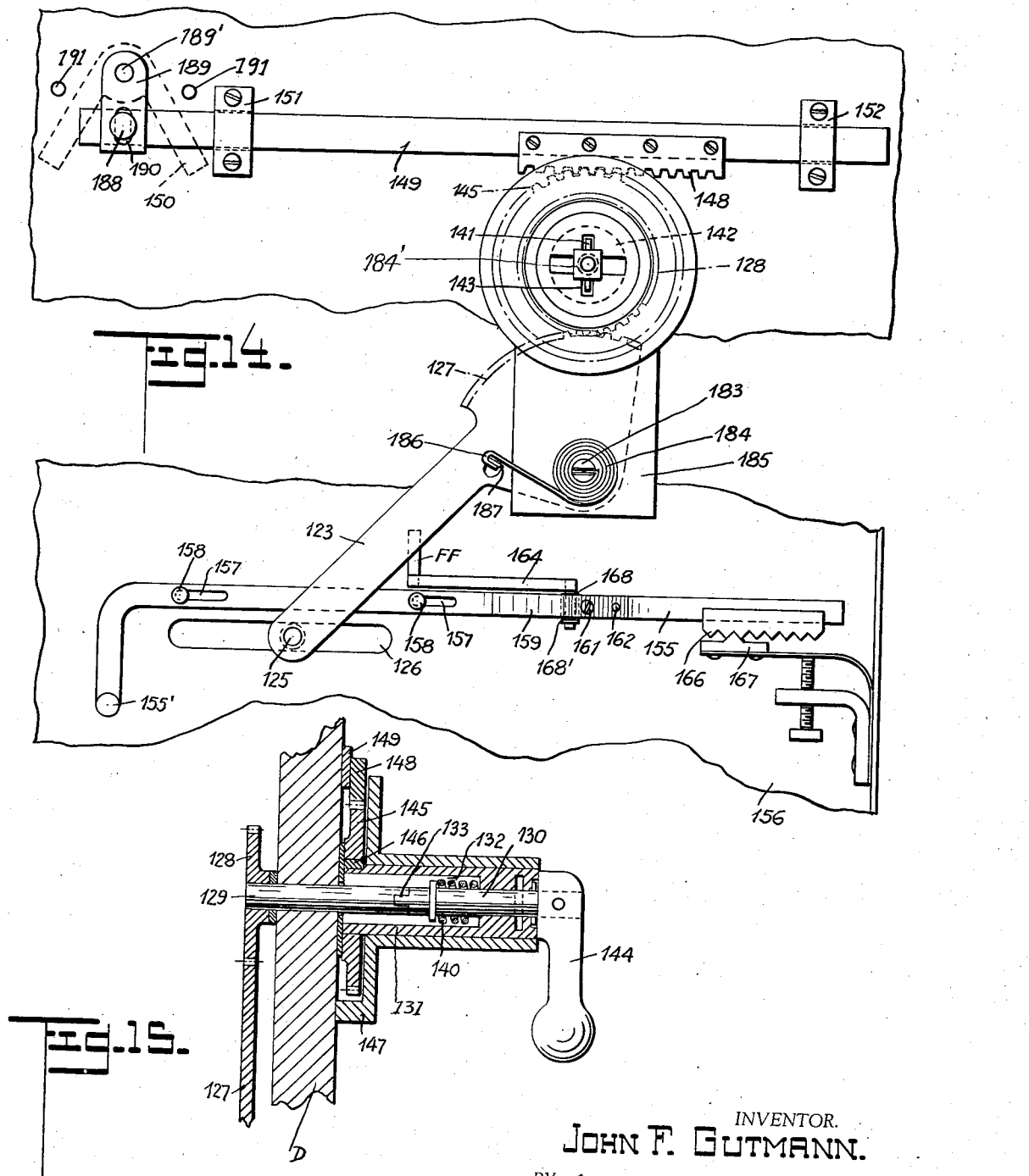

Patented Apr. 26, 1938

2,115,262

UNITED STATES PATENT OFFICE 2,115,262

WINDOW CONSTRUCTION FOR VEHICLES

John F. Gutmann, St. Albans, N. Y., assignor of fifty percent to Reynold Goodman, New York, N. Y.

Application July 1, 1933, Serial No. 678,648

2 Claims. (Cl. 296—44)

This invention relates to improvements in window construction for vehicles and more particularly to that class thereof which permits of the window being opened and closed in a horizontal direction as well as in a vertical direction, such as, for instance that described and shown in my copending application for window construction, Serial No. 669,678, filed May 6th, 1933, the invention disclosed in the present application being an improvement thereover.

An object of this invention is to provide a simple, efficient and economical window construction for vehicles which will give a no-draft ventilation, the window being adapted to be opened and closed in a vertical direction and horizontally-swung at an angle, and mechanism to operate the said window.

It is a further object of this invention to combine the advantages of a horizontally-swinging with a vertically sliding window in a vehicle, in a practical and efficient manner, to give a no-draft ventilation, both the horizontally-swinging and vertical sliding movements being operable from a single control and from a point within the vehicle body remote from the window.

These and other objects of the invention and the means for their attainment will be more apparent from the following detailed description, taken in connection with the accompanying drawings, illustrating a preferred and a modified embodiment by which the invention may be realized, and in which:

Fig. 1 is a perspective inside view of a vehicle door, the window being shown in lowered position.

Fig. 2 is a perspective inside view of a vehicle door, the window being shown in raised and horizontal open or ventilating position.

Fig. 3 is a perspective inside view of a vehicle door showing the window in raised and horizontally-closed position.

Fig. 4 is a perspective diagrammatic view of the window frame.

Fig. 5 is a perspective view of a weather strip bar used in conjunction with the window frame shown in Fig. 4.

Fig. 6 is a diagrammatic view of the window raising and lowering mechanism.

Fig. 7 is a sectional view showing a form of anti-rattling means for the window.

Fig. 8 is a perspective detailed view of the bottom of the window frame with the window operating mechanism.

Fig. 9 is a perspective detailed view of a part of the operating mechanism.

Fig. 10 is a sectional view of the two-way handle control mechanism in the position for raising or lowering the window.

Fig. 11 is a sectional view of the two-way handle control mechanism in the position for swinging the window horizontally.

Fig. 12 is a sectional view taken along line 12—12 of Fig. 11.

F'g. 13 is a sectional view taken along line 13—13 of Fig. 12.

Fig. 14 is a front view of a modified form of operating mechanism contemplated by the invention.

Fig. 15 is a sectional view of a modified form of control mechanism contemplated by the invention.

Like characters in the drawings designate corresponding parts in all the views.

In a vehicle door 20, with the conventional window opening 21, a conventional window raising and lowering mechanism 22 is provided.

This mechanism raises and lowers the outer frame or sash 56 which is slidingly mounted within the vehicle door 20 in the conventional manner. The inner glazed frame 65 is pivotally mounted in the outer frame 56 by means of pivots F and FF, to swing in a horizontal direction.

A typical raising and lowering mechanism is shown diagrammatically in Fig. 6, where the numeral 23 represents the window raising arm fulcrumed at 24 on the inside of one of the door panels. Roller 25 rides in a slot 26 in the bottom of window frame 56 as clearly indicated in Fig. 4. Toothed sector 27 on the opposite end of arm 23 engages with a gear wheel 28, keyed to portion or element 29 of the duplex shaft.

The duplex shaft comprises two aligned elements 29 and 30, rotatably mounted in a hollow shaft 31. A cut-out 32 is provided in the hollow shaft 31 to facilitate the accessibility of the duplex shaft at its coupling 33 which generally consists of a plurality of teeth 34, 34' adapted for interengagement and constituting the elements of a clutch. Shaft 29 is mounted in the hollow shaft 31 for rotation only, longitudinal movement thereof being prevented by washer 35 and cotter pin 36.

The free end of shaft portion 29 carries gear 28 to which the latter is keyed by means of key 37. Shaft element 30 is mounted for both rotatable and sliding movements, and is retained within hollow shaft 31 by washer 38 and cotter pin 39. The shaft element 30 is normally held in engagement with shaft element 29, by means of a tension spring 40. Pin 41 in the forward end of shaft element 30 permits element 30 to be rotated only when in circular groove 42 as shown in Fig. 10. When pulled out as shown in Fig. 11, the said pin 41 rests in a slot 43, provided in hollow shaft 31, thereby permitting the hollow shaft 31 to be rotated by the handle 44 and in this way operating gear 45, keyed to hollow shaft 31 by means of key 46. The entire hollow shaft 31 is adapted to rotate in a sleeve 47, the latter being positioned in the door frame.

Gear 45 engages with the teeth 48 of operating bar 49. Said operating bar is preferably made of flat material as shown in Fig. 9. At the end of bar 49 further from its toothed portion 48 a forked member 50 is provided, flared out at its bottom portion for the purpose hereinafter explained.

Operating bar 49 is held in place by U-shaped clamps 51, 52 fastened to the inside of the door panel. Clamp 51 is provided with a slot 53 in which pin 54 operates, said pin being affixed to bar 49 thereby preventing any further longitudinal movement of operating bar 49 than required.

While the drawings show Fig. 8 above Fig. 9, for the purpose of clearly illustrating the parts, it is understood, that cam bar 55, which is attached to window frame 56 at its lower part, will never come above forked member 50 when in raised position, and below forked member 50 when in lowered position. The flare in the fork 50 is provided for assuring the engagement of outwardly-disposed projection 55' of cam bar 55 on its upward movement. The bar 55 is provided with slots 57 for securing the said bar 55 to the outer window frame 56 by means of washers and bolts 58. The cam bar 55 is outwardly bent at 59, in the inside of which a triangular piece 60 is fastened by means of screw 61 and pin 62. This triangular piece 60 is slightly smaller than the gap formed in bar 55, thereby forming a slanting channel 63. A lever 64, which has one end attached by means of pivot FF, to the bottom of the inner window frame 65, has a projection 68 reaching into the channel 63. In causing bar 55 to be moved over by operating arm 49, the pin 68 will slide forward in channel 63, thereby swinging the inner glazed frame 65 open horizontally to its proper angle. To secure the window in its predetermined angle of opening, teeth 66 on bar 55 for engagement with spring pawl 67 are provided. After the proper adjustment is made, the pawl 67 is held in fixed engagement with bar 55 by screw S threadedly operable in bracket B secured to frame 56.

Anti-rattlers may be provided to prevent the window from rattling, a form of anti-rattler is disclosed in Fig. 7 of the drawings in which the numeral 75 represents any portion of the window frame. The numeral 76 represents the opening between the outer and inner door panels P, to each one of which a spring roller element is secured. The roller element may consist of a resilient roller 77 having a metal bushing 78 and a tension spring 79, which is also used as a shaft through bushing 78.

A weather strip 81 (see Fig. 5) may be employed to secure the interior of the vehicle against drafts which may come through the window pocket 76, for which purpose the said strip 81 is provided with a resilient member 82 fitting in groove 83. This weather strip forms the bottom element of the window opening frame in sash 56.

The operation of the device is as follows: To slide outer frame 56 up or down, the duplex shafts 29 and 30 are engaged at 33 as shown in Fig. 10. To accomplish this handle 44 is pushed in thereby permitting pin 41 to freely rotate within groove 42. As gear 28 is keyed to the shaft 29, this gear will rotate with handle 44. Rotation of gear 28 will move toothed sector 27, raising and lowering the window, respectively.

To horizontally swing the inner glazed window frame 65, when the window is in fully raised position, handle 44 is turned such that pin 41 can be withdrawn from circular slot 42, thereby permitting handle 44 with shaft element 30 being moved outwardly and disengaging shaft element 30 from shaft element 29, as clearly illustrated in Fig. 11. Pin 41 at this time is engaged in short slots 43, which being located in hollow shaft 31, will now permit the rotation of hollow shaft 31 together with handle 44. Gear 45, being keyed to hollow shaft 31, will rotate with movement of handle 44 thereby operating bar 49 for forward and backward movement. Since, when the window is in raised position projection 55' of operating cam bar 55 is within the slot or opening 50' of forked member 50, cam bar 55 will be pulled and pushed longitudinally, thereby turning lever 64 and pivot FF to horizontally swing the inner glazed window frame 65 to open and close the same.

While the drawings show the vertical sliding or raising and lowering movement of the outer frame 56 as being controlled by the handle 44 when the clutch 33 is engaged, and the horizontal swinging movement of the inner glazed window frame 65 as being controlled by handle 44 when pulled out and the clutch 33 disengaged, it is understood that by the interchanging of certain of the parts reversal of said operations may be brought about, that is, by engagement of the clutch horizontal swinging movement may be effected, and by disengagement of the clutch vertical sliding movement of the window may be effected.

In Figures 14 and 15 which show the invention in a modified form, parts corresponding to parts hereinabove described are designated by the same numerals prefixed with the numeral 1.

The bar 149 is shown as secured to the outside of the door panel D by the brackets 151 and 152. The bifurcated member or fork 150 is located on the other side of the panel D and is secured to the arm 189 by means of pin 189', the said arm 189 being pivoted to bar 149 at its slotted portion 190 by pin 188. Stops 191 may be provided to limit the movement of the fork 150.

Secured to bar 149 is a rack 148, the teeth of which are in engagement with teeth of gear 145 fixed to sleeve 131 by key 146.

Bushing or housing 147 holding the handle control mechanism is secured to panel D. Shafts 129 and 130 are adapted to couple at 133 being held normally in engagement by spring 140 in bore 132. Gear 128 is fixed to rotate with shaft 129. Handle 144 is fixed to shaft 130. Pin 141 in shaft 130 permits the latter to be rotated only in circular groove 142, and when shaft 130 is pulled out, the pin 141 rests in slot 143 of hollow shaft 131, thereby permitting the latter to be rotated by handle 144.

Gear 128 is in engagement with toothed sector 127 of arm 123, the latter having a pin 125 which is adapted to ride in slot 126 of outer window frame 156. Coil spring 184 has its hooked end 186 secured to arm 123 as shown at 187, its other end being secured by means of screw 183 to plate 185. The coil spring 184 in cooperation with coil spring 184', in the conventional manner, are adapted to hold arm 123 in raised position.

The cam bar 155 is attached to window frame 156 and has a projection 155' to be engaged by fork 150. Bar 155 is provided with slots 157 in which are adapted to ride the pins or bolts 158 secured to frame 156. Bar 155 is outwardly bent at 159 in the inside of which a triangular piece and a channel (not shown) but similar to that shown at 60 and 63, respectively, (see Fig. 8), are arranged. The triangular piece is secured to bar 155 by screw 161 and pin 162. The lever 164 has a projection 168 reaching into the channel and is provided with a freely rotatable sleeve 168' to reduce friction. The toothed strip 166 and pawl 167 are used for the purpose hereinabove described with reference to the preferred embodiment.

The operation of the embodiment of the invention in its above described modified form is similar to that heretofore given with respect to the preferred form of the invention.

It is believed from the above description that those skilled in the art will have no difficulty in understanding the construction, the method of use and operation of the device herein disclosed and a further detailed discussion thereof is unnecessary. The invention is of simple and practical construction and is adapted to accomplish among others all of the objects and advantages herein set forth.

Without further analysis, the foregoing will so fully reveal the gist of this invention that others can by applying current knowledge readily adapt it for various applications without omitting certain features, that, from the standpoint of the prior art, fairly constitute essential characteristics of the generic or specific aspects of this invention, and therefore, such adaptations should and are intended to be comprehended within the meaning and range of equivalency of the following claims.

I claim:

1. A structure of the character described, comprising a vertically-slidable frame, a window mounted for swinging movement in the frame, mechanism to slidably operate the frame, said mechanism including a rotatable element, mechanism to swingably operate the window and comprising a rotatable element, a slide movable by rotation of said element, a cam bar operable by the slide, the window being provided with means engaging the bar in such manner that the bar when operated by the slide will cause swinging movement of the window, concentric shafts connected to said elements, respectively, and a control handle adapted for selective engagement with the said shafts.

2. A structure of the character described, comprising a vertically-slidable frame, a window mounted for swinging movement in the frame, mechanism to slidably operate the frame, said mechanism including a rotatable element, mechanism to swingably operate the window and comprising a second rotatable element, a slide movable by rotation of said second element, a cam bar operable by the slide, the window being provided with means engaging the bar in such manner that the bar when operated by the slide will cause swinging movement of the window, concentric shafts connected to said elements, respectively, and a control handle selectively engageable with said elements.

JOHN F. GUTMANN.